(12) United States Patent
Nowack

(10) Patent No.: US 10,278,507 B1
(45) Date of Patent: May 7, 2019

(54) BENCH SEAT WITH BOLSTER CONFIGURATION

(71) Applicant: Paul F. Nowack, Stuart, FL (US)

(72) Inventor: Paul F. Nowack, Stuart, FL (US)

(*) Notice: Subject to any disclaimer, the term of this patent is extended or adjusted under 35 U.S.C. 154(b) by 0 days.

(21) Appl. No.: 16/027,687

(22) Filed: Jul. 5, 2018

(51) Int. Cl.
  *A47C 7/40* (2006.01)
  *A47C 7/54* (2006.01)
  *A47C 7/24* (2006.01)
  *A47C 11/00* (2006.01)

(52) U.S. Cl.
  CPC .............. *A47C 7/407* (2013.01); *A47C 7/24* (2013.01); *A47C 7/543* (2013.01); *A47C 11/00* (2013.01)

(58) Field of Classification Search
  USPC .................................................. 297/108–111
  See application file for complete search history.

(56) References Cited

U.S. PATENT DOCUMENTS

| | | | | |
|---|---|---|---|---|
| 4,025,063 A * | 5/1977 | Willison | ............... | B60G 11/22 267/153 |
| 4,934,303 A * | 6/1990 | Lathers | ................... | B63B 29/04 114/363 |
| 4,970,743 A * | 11/1990 | Wride | ................... | A47C 27/085 5/201 |
| 5,099,529 A * | 3/1992 | Anderson | .............. | A47C 19/04 5/201 |
| 5,364,151 A * | 11/1994 | Yurasits | ................... | A47C 9/06 180/326 |
| 5,564,141 A * | 10/1996 | Anderson | ............ | A47C 27/085 5/668 |
| 5,619,949 A * | 4/1997 | Dick, Jr. | .................. | B63B 29/04 114/363 |
| 5,715,548 A * | 2/1998 | Weismiller | ............... | A61G 7/00 5/611 |
| 6,802,563 B1 * | 10/2004 | Mysliwiec | ............. | B60N 2/206 297/284.9 |
| 6,990,920 B2 * | 1/2006 | Hamilton | ................ | B63B 29/04 114/347 |
| 7,125,079 B1 * | 10/2006 | Lee | .......................... | A47C 3/18 297/353 |

(Continued)

OTHER PUBLICATIONS

Brochure, Premier Performance Interiors, www.ppi-fl.com, 2014, 24 pages.

*Primary Examiner* — David E Allred
(74) *Attorney, Agent, or Firm* — Duane Morris LLP; Gregory M. Lefkowiz; Jason M. Nolan

(57) ABSTRACT

A bench seat is described. The bench seat includes a primary cushion and a reconfigurable bolster. The reconfigurable bolster can include an intermediate portion and at least two arms extending from the intermediate portion. The plurality of arms can be spaced-apart laterally and adapted to receive a person leaning against the bolster. The primary cushion can include an insert depression adapted for receiving the reconfigurable bolster when the arms extend toward the primary cushion. The reconfigurable bolster can be removeably coupled to the bench seat with the arms extending toward or away from the primary cushion. The reconfigurable bolster is height adjustable. The reconfigurable bolster can be in a stored position when it is pushed down into the insert depression, and in a use position when the arms extend away from the primary cushion. The intermediate portion can be in about the same position in either position.

19 Claims, 13 Drawing Sheets

(56) References Cited

U.S. PATENT DOCUMENTS

| | | | | |
|---|---|---|---|---|
| 7,252,336 B2* | 8/2007 | Frisina | B60N 2/1695 | |
| | | | 297/118 | |
| 7,270,376 B2* | 9/2007 | Jackson | B60N 2/643 | |
| | | | 297/452.21 | |
| 7,445,292 B2* | 11/2008 | Moule | B60N 2/643 | |
| | | | 297/452.25 | |
| 7,661,764 B2* | 2/2010 | Ali | B68G 7/05 | |
| | | | 297/452.26 | |
| 7,934,774 B2* | 5/2011 | Galbreath | B60N 2/70 | |
| | | | 297/452.26 | |
| 9,738,192 B2* | 8/2017 | Hirata | B60N 2/01508 | |
| 10,112,509 B1* | 10/2018 | Robertson | B60N 2/2884 | |
| 2001/0029628 A1* | 10/2001 | Ferrand | A61G 7/00 | |
| | | | 5/600 | |
| 2002/0124311 A1* | 9/2002 | Peftoulidis | A47C 17/86 | |
| | | | 5/308 | |
| 2002/0158492 A1* | 10/2002 | Ko | A47C 7/54 | |
| | | | 297/112 | |
| 2002/0178503 A1* | 12/2002 | Reeder | A61G 7/05776 | |
| | | | 5/690 | |
| 2003/0164639 A1* | 9/2003 | Infanti | A47C 4/02 | |
| | | | 297/440.1 | |
| 2006/0053555 A1* | 3/2006 | Poulos | A61G 7/005 | |
| | | | 5/618 | |
| 2008/0191524 A1* | 8/2008 | Takai | B60N 2/002 | |
| | | | 297/217.2 | |
| 2008/0236452 A1* | 10/2008 | Pratt | A47B 85/00 | |
| | | | 108/13 | |
| 2010/0045078 A1* | 2/2010 | Lee | A47C 7/402 | |
| | | | 297/118 | |
| 2012/0248836 A1* | 10/2012 | Lejcher | A47C 17/02 | |
| | | | 297/232 | |
| 2012/0304389 A1* | 12/2012 | Ranck | A47C 13/00 | |
| | | | 5/655.9 | |
| 2014/0284980 A1* | 9/2014 | Dick, Jr. | B63B 29/04 | |
| | | | 297/331 | |
| 2016/0120332 A1* | 5/2016 | Chou | A47C 31/11 | |
| | | | 297/225 | |
| 2016/0214689 A1* | 7/2016 | Foss | B63B 29/04 | |
| 2017/0150819 A1* | 6/2017 | Jones | A47C 27/10 | |

* cited by examiner

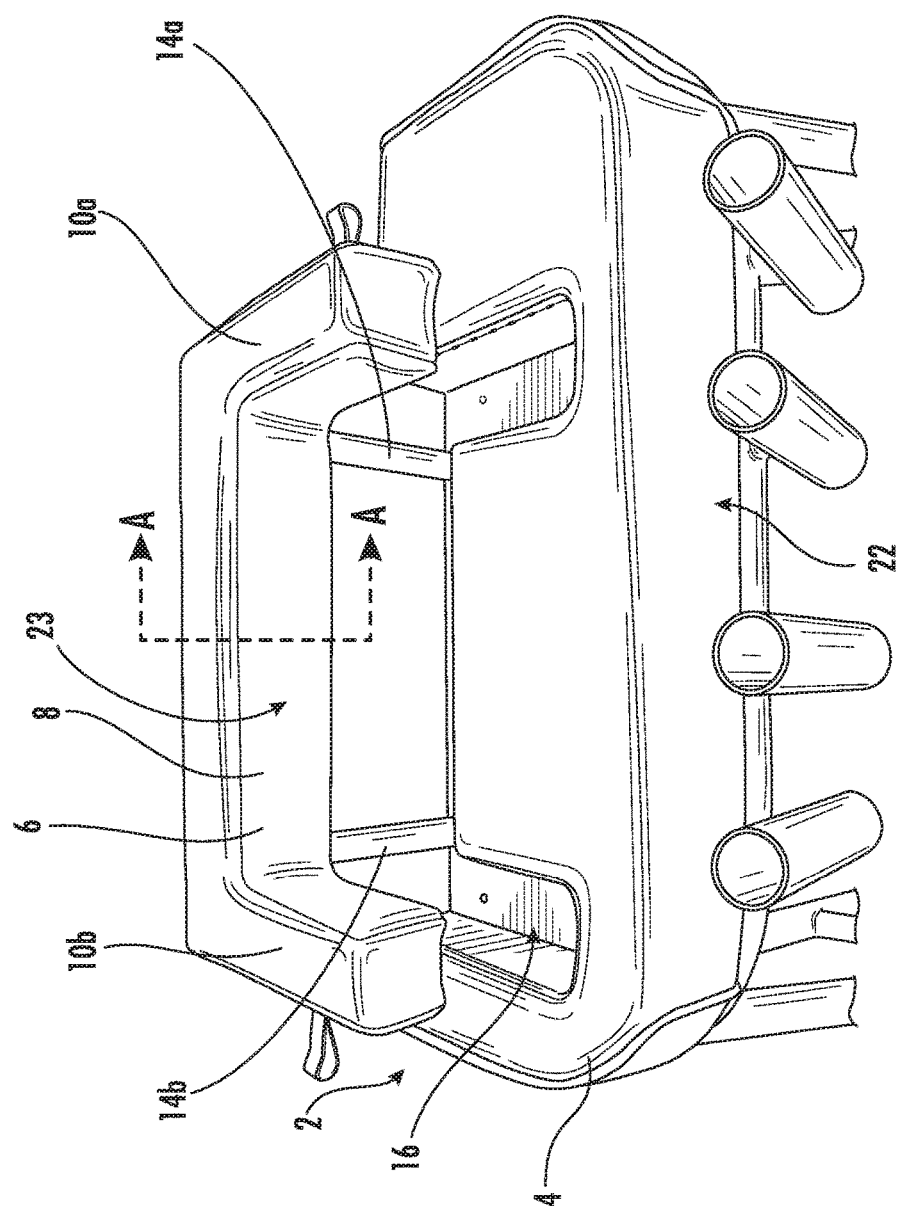

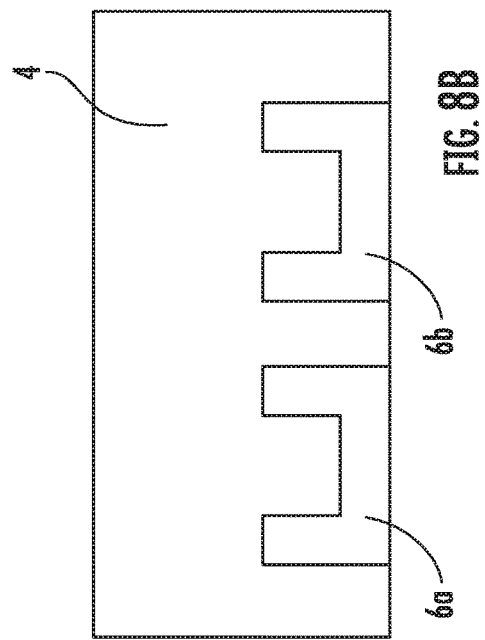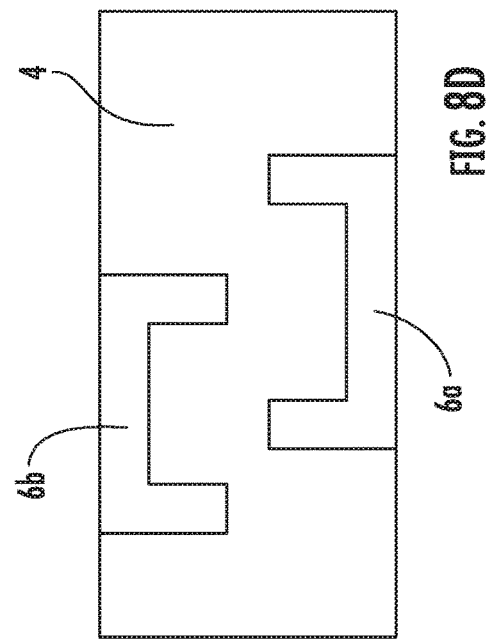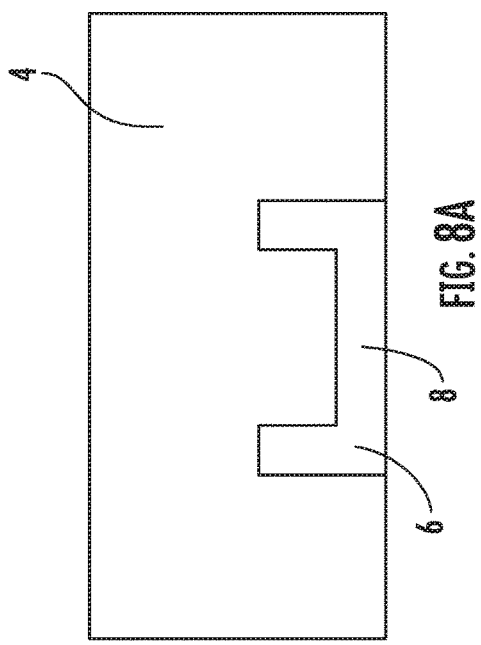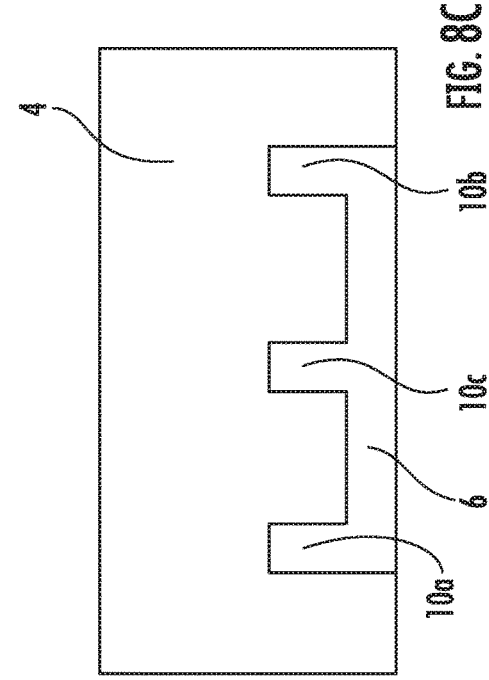

BENCH SEAT WITH BOLSTER CONFIGURATION

BACKGROUND

Bench seats for boats, including center-console boats in particular, are typically positioned behind and in proximity to the driving console so that the captain can sit on or lean against the bench seat when operating the boat. Bench seats come in a variety of styles.

SUMMARY

In various embodiments, a bench seat is disclosed. The bench seat comprises a primary cushion and at least one reconfigurable bolster. The reconfigurable bolster can comprise an intermediate portion, and at least two arms that are spaced-apart laterally along the intermediate portion and adapted to receive a person leaning against the bolster. The primary cushion can comprise an insert depression adapted for receiving the reconfigurable bolster when the two or more arms extend toward the primary cushion. The reconfigurable bolster can be removeably coupled to the bench seat either with the two or more arms extending toward the primary cushion or with the arms extending away from the primary cushion. The reconfigurable bolster is height adjustable with respect to the primary cushion. The reconfigurable bolster can be in a stored position when the arms extend toward the primary cushion and it is pushed down into the insert depression, and in a use position when the arms extend away from the primary cushion. The user-contacting portion of the intermediate portion can be in about the same position with respect to the primary cushion whether the reconfigurable bolster is in the stored position or the use position.

BRIEF DESCRIPTION OF THE FIGURES

The features and advantages of the present invention will be more fully disclosed in, or rendered obvious by the following detailed description of the preferred embodiments, which are to be considered together with the accompanying drawings wherein like numbers refer to like parts and further wherein:

FIG. 3 is a rear perspective view of the bench seat, in accordance with some embodiments described herein.

FIG. 8A is a top view of the bench seat, in accordance with some embodiments described herein. FIG. 8B is a top view of the bench seat, in accordance with some embodiments described herein. FIG. 8C is a top view of the bench seat, in accordance with some embodiments described herein. FIG. 8D are top views of the bench seat, in accordance with some embodiments described herein.

DETAILED DESCRIPTION

Figure 1:
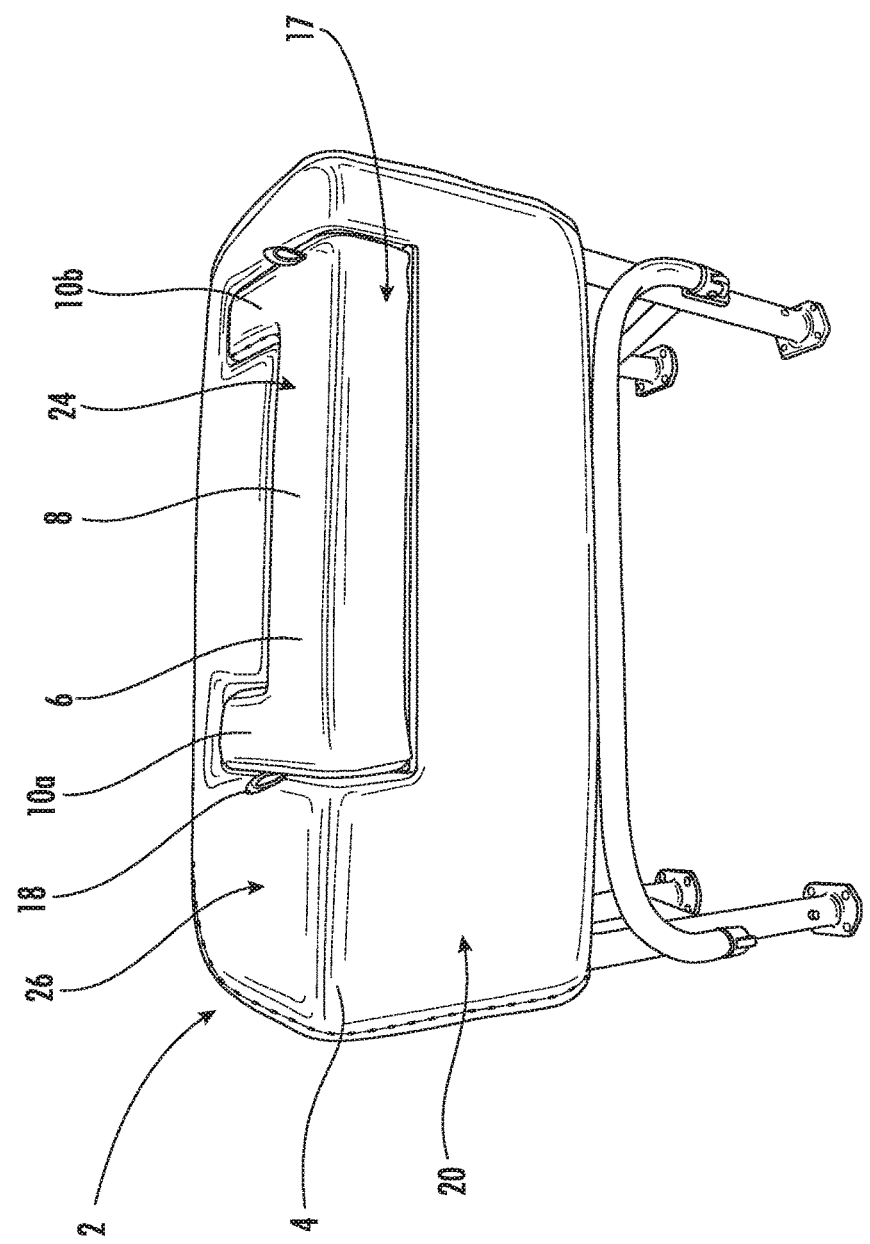
FIG. 1 is a front perspective view of a bench seat, in accordance with some embodiments described herein.

The description of the embodiments is intended to be read in connection with the accompanying drawings, which are to be considered part of the entire written description. The drawing figures are not necessarily to scale and certain features of the may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

A bench seat including a primary cushion and at least one reconfigurable bolster is provided. The at least one reconfigurable bolster includes at least two arms and an intermediate portion from which the arms extend. In some embodiments, the at least one reconfigurable bolster can include at least one positioning rod extending from a lower side, and the bench seat can include at least one opening adapted for receiving the positioning rod. The primary cushion includes an insert depression adapted for receiving the at least one reconfigurable bolster when the at least two arms extend toward the primary cushion. The at least one reconfigurable bolster can be removeably coupled to the bench seat either with the arms extended toward the primary cushion or with the arms extending away from the primary cushion.

Figure 6A:
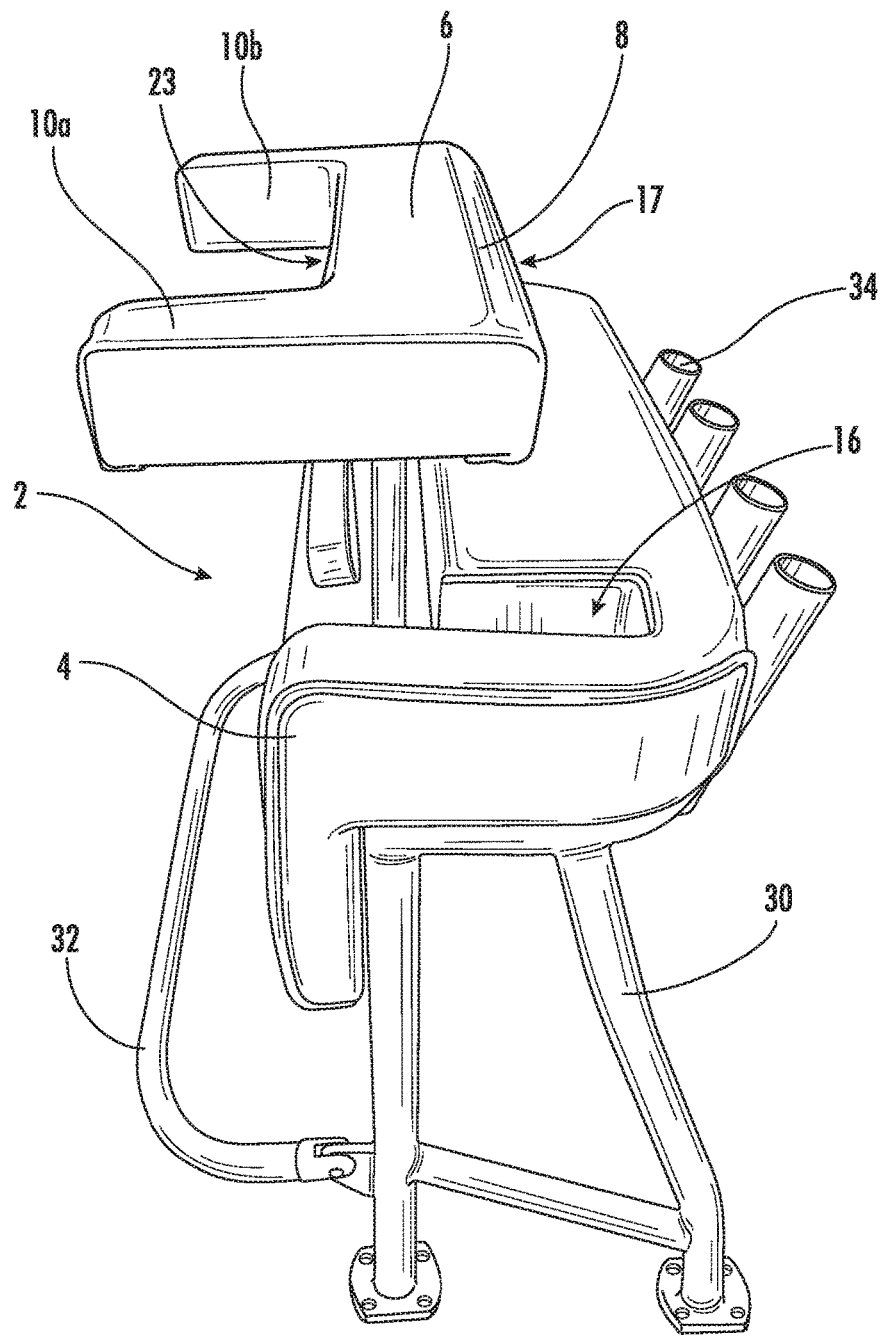
FIG. 6A is a side perspective view of the bench seat, in accordance with some embodiments described herein.
Figure 6B:
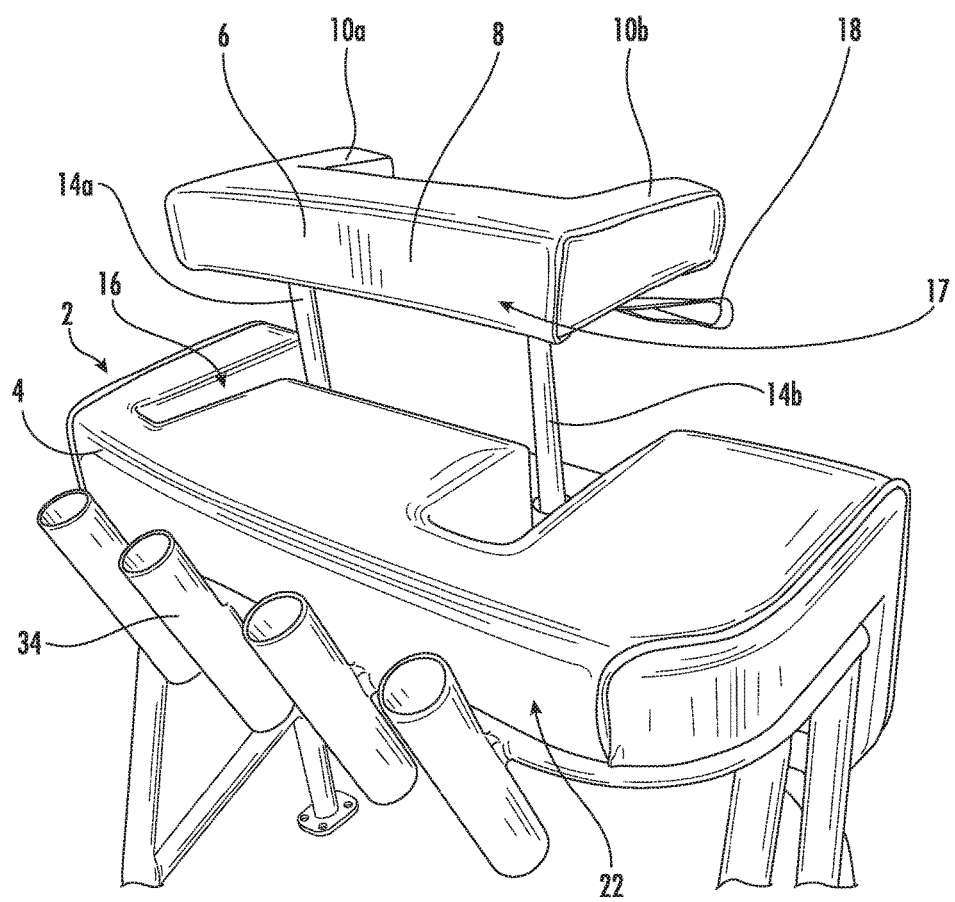
FIG. 6B is a rear perspective view of the bench seat, in accordance with some embodiments described herein.
Figure 7:
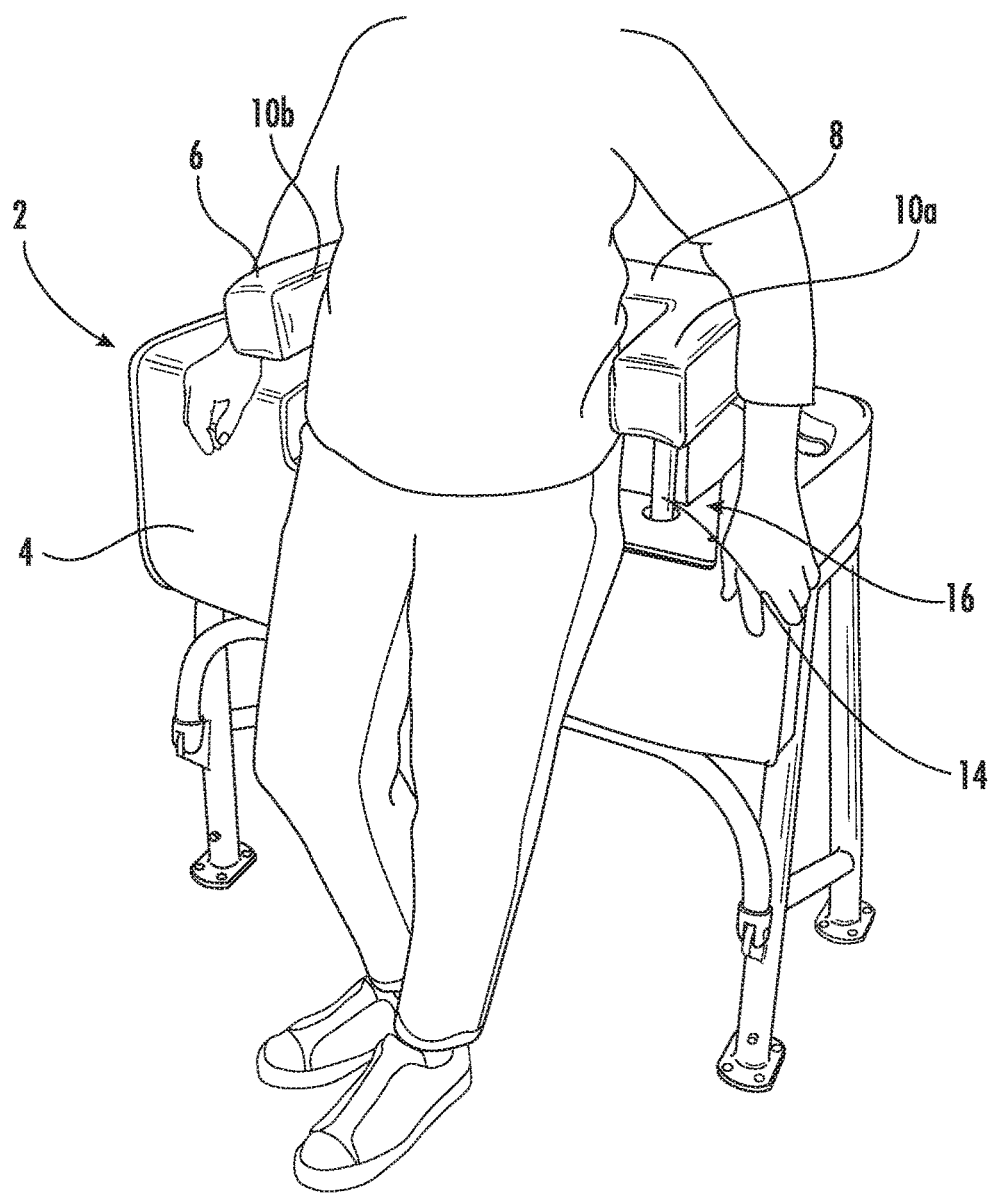
FIG. 7 is an environmental view of a user leaning against the bench seat, in accordance with some embodiments described herein.

FIGS. 1-9C illustrate various embodiments of a bench seat (2). The bench seat (2) can be any suitable size and shape. The bench seat (2) includes a primary cushion (4) and at least one reconfigurable bolster (6). The reconfigurable bolster (6) includes an intermediate portion (8) and at least two arms (10) extending from the intermediate portion (8). In some embodiments, as shown in FIGS. 8A and 8E, the reconfigurable bolster (6) includes two arms (10a, 10b). In some embodiments, as shown in FIGS. 8C and 8G, the reconfigurable bolster (6) includes three arms (10a, 10b, 10c). In such embodiments, the arms (10) are spaced-apart laterally and adapted to receive one or more persons leaning against the bolster (6). For example, as shown in FIG. 7, the reconfigurable bolster (6) includes two arms (10a, 10b) extending from opposing ends of the intermediate portion (8), and the two arms extend parallel to and spaced apart from one another with respect to the intermediate portion (8).

Figure 8E:
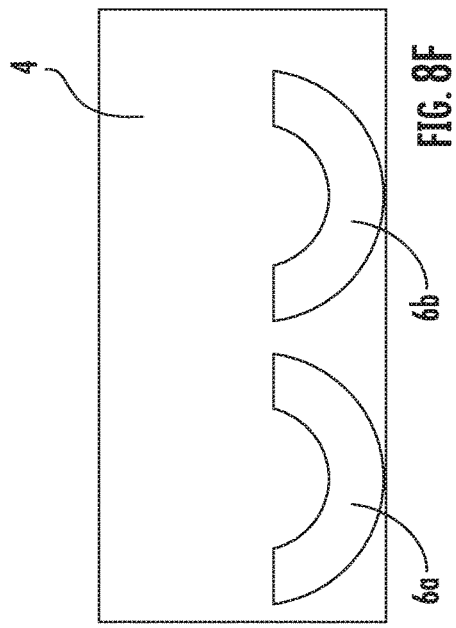
FIG. 8E is a top view of the bench seat, in accordance with some embodiments described herein.

The reconfigurable bolster (6) can be any suitable size and shape. For example, as shown in FIGS. 8A-H, the intermediate portion (8) and arms (10) have a concave shape adapted for receiving a person leaning against the bolster (6). In some embodiments, for example, the concave shape can be bracket-shaped (e.g., FIGS. 8A-8D) or curved-shaped (e.g., FIGS. 8E-8H). In such embodiments, the intermediate portion (8) provides support against longitudinal forces (e.g., those experienced when a boat accelerates) and the arms (10) provide support against lateral forces (e.g., those experienced when a boat is turning). In some embodiments, as in FIGS. 8E-8H, the arms (10) can appear to be a continuous extension from the intermediate portion (8). Depending on the shape of the reconfigurable bolster (6), the intermediate portion (8) can have an appropriate shape. For example, as shown in FIGS. 8A-8H, the intermediate portion (8) can have a rectangular or an elongated curved structure when viewed from above. As shown in FIGS. 5A-7, for example, the intermediate portion (8) can extend laterally a distance sufficient for a user to comfortably and securely lean back against it. In some embodiments, as shown in FIGS. 8A and 8E, the intermediate portion (8) can extend laterally a distance sufficient for two users to comfortably and securely lean back against it.

Figure 9C:
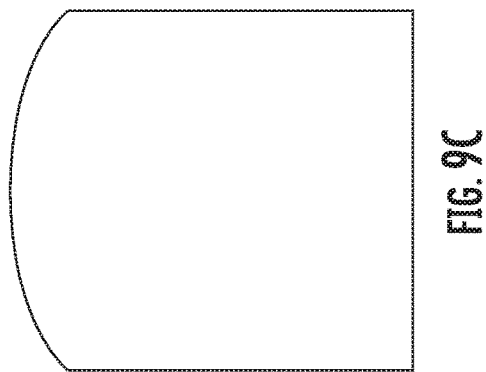
FIG. 9C is a sectional view along the A-A line in FIG. 3, in accordance with some embodiments described herein.
Figure 9A:
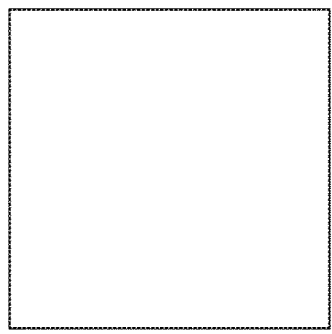
FIG. 9A is a sectional view along the A-A line in FIG. 3, in accordance with some embodiments described herein.
Figure 9B:
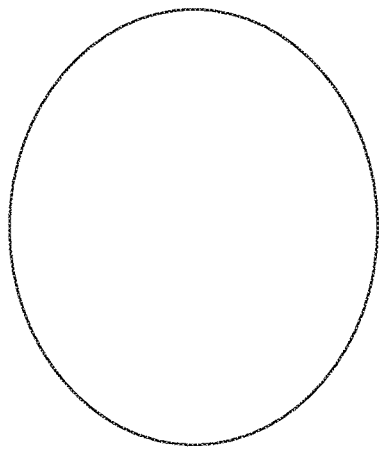
FIG. 9B is a sectional view along the A-A line in FIG. 3, in accordance with some embodiments described herein.

In some embodiments, the intermediate portion (8) is an elongated rectangular structure when viewed from above. As shown in FIGS. 9A-9C, which are possible cross-sections of the bolster (6) in FIG. 3, the intermediate portion (8) can have any suitable cross-sectional shape, including rectangular as shown in FIG. 9A, circular or oblong as shown in FIG. 9B, a rectangular shape with a curved surface on one or more faces as shown in FIG. 9C, or some combination thereof. For example, the intermediate portion (8) can have a rectangular section while another section is semi-circular.

The at least two arms (10) can be integrally coupled to the intermediate portion (8) in any suitable manner. For example, the two arms (10) can be separate components coupled to the intermediate portion (8) to form an assembled integral reconfigurable bolster (6), or the two arms (10) can be a continuous extension of the intermediate portion (8) to form the reconfigurable bolster (6). In some embodiments, as shown in FIG. 6B, the two arms (10a, 10b) can extend laterally from the back surface (17) of opposing ends of the intermediate portion (8) to the front surface (25) of each arm. In some embodiments, the arms (10) extend at an angle less than 90 degrees with respect to the back surface (17) of the intermediate portion (8). In some embodiments, for example as in FIGS. 8E-8H, the arms (10) extend at an angle greater than 90 degrees with respect to the back surface (17) of the intermediate portion (8).

The at least two arms (10) can be any suitable size and shape when viewed from above, and can have any suitable cross-sectional shape. Depending on the shape of the reconfigurable bolster (6), the at least two arms (10) can have an appropriate shape. For example, as shown in FIGS. 8E-8H, the at least two arms (10) can have a rectangular or curved structure when viewed from above. Further, the cross-sectional shape can be rectangular as shown in FIG. 9A, circular or oblong as shown in FIG. 9B, a rectangular shape with a curved surface on one or more faces as shown in FIG. 9C, or some combination thereof. For example, the arms (10) can have a rectangular section while another section is semi-circular.

In some embodiments, the primary cushion (4) includes at least one insert depression (16) adapted for receiving the at least one reconfigurable bolster (6). In some embodiments, the primary cushion (4) includes a plurality of insert depressions (16) for receiving a plurality of reconfigurable bolsters (6). In some embodiments, each insert depression (16) is adapted for receiving the reconfigurable bolster (6) when the arms (10) extend toward the primary cushion (4). In some embodiments, each insert depression (16) is adapted for receiving the reconfigurable bolster (6) when the arms (10) extend away from the primary cushion (4). In some embodiments, the size and shape of the insert depression (16) generally corresponds to the size and shape of the reconfigurable bolster (6). In some embodiments, the size and shape of the insert depression (16) corresponds to the specific size and shape of the intermediate portion (8) and arms (10) of the reconfigurable bolster (6) and is a sufficient depth that when the bolster (6) is stored in the insert depression (16), the upper edges of the upper surfaces of the bolster (6) and insert depression (16) are essentially (e.g., ±1 inch, ±0.5 inches, ±0.25 inches, etc.) the same height.

Figure 2:
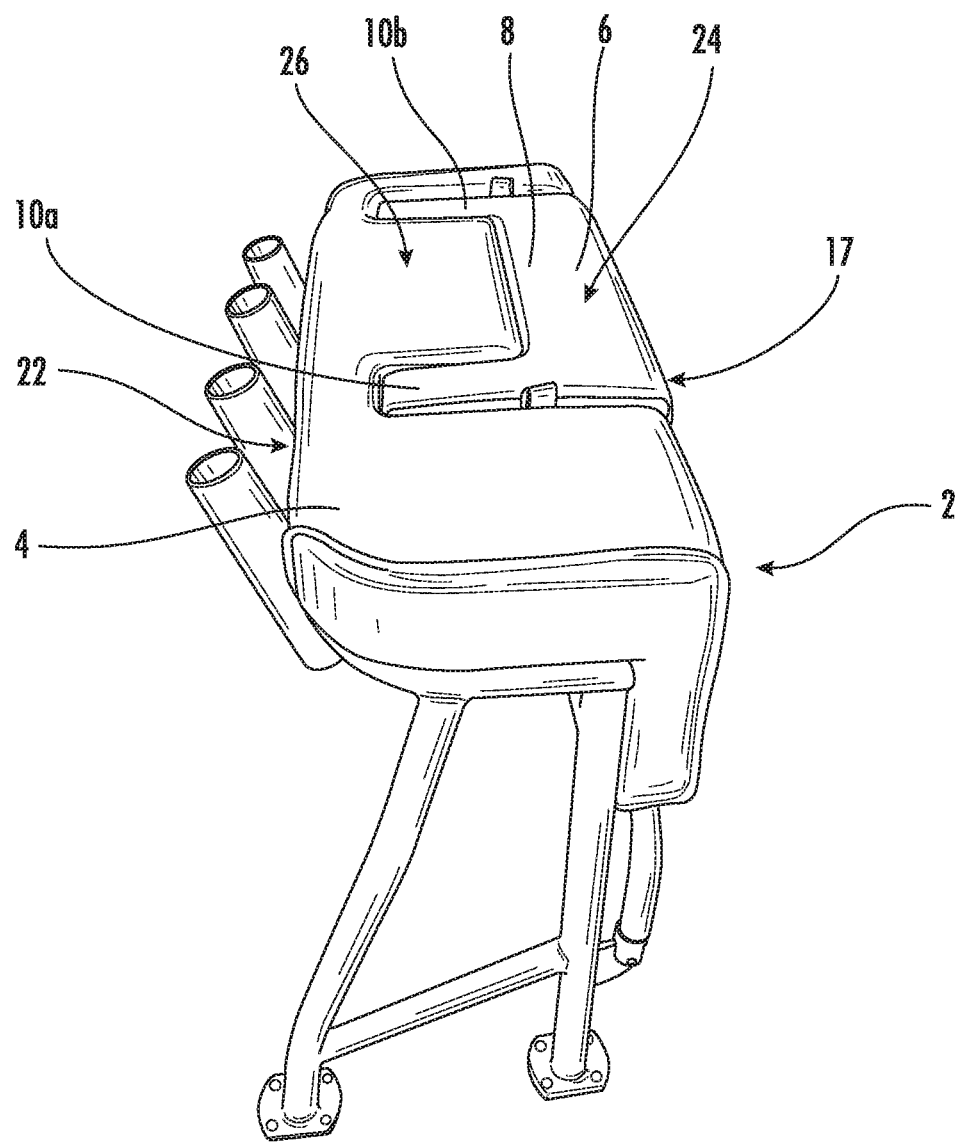
FIG. 2 is a side perspective view of the bench seat, in accordance with some embodiments described herein.
Figure 5A:
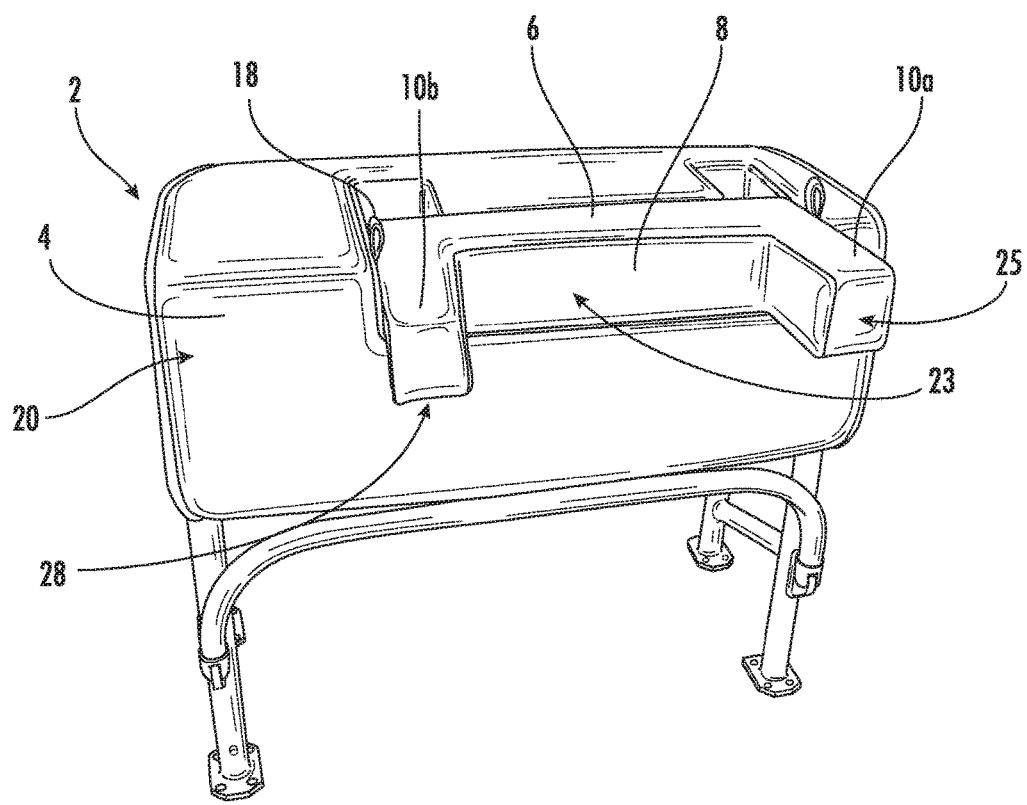
FIG. 5A is a front perspective view of the bench seat, in accordance with some embodiments described herein.

The primary cushion (4) can include a front surface (20) and a rear surface (22). In some embodiments, the reconfigurable bolster (6) can be removeably coupled to the bench seat (2). In such embodiments, the arms (10) can extend toward or away from the primary cushion (4) depending on the position and orientation of the reconfigurable bolster (6). In such embodiments, the arms (10) can extend toward the rear surface (22), as in FIGS. 1-3, or past the front surface (20) of the primary cushion (4), as in FIGS. 5A-7. In some embodiments, as shown in FIGS. 1 and 2, the reconfigurable bolster (6) can fit flush within the insert depression (16) when the reconfigurable bolster (6) is pushed down into the insert depression (16). In such embodiments, the combination of the primary cushion (4) and the reconfigurable bolster (6) forms a seat when the arms face toward the primary cushion (4). In some embodiments, the bench seat (2) can be rectangular when viewed from above. In such embodiments, as shown in FIGS. 1 and 2, adjacent portions of the back surface (17) of the reconfigurable bolster (6) and the front surface (20) of the primary cushion (4) are essentially even and/or form a continuous front edge. In such embodiments, adjacent portions of the top side (24) of the reconfigurable bolster (6) and the top surface (26) of the primary cushion (4) are essentially even and/or form a continuous top surface. In some embodiments, as shown in FIGS. 2 and 5A, the intermediate portion (8) can fit flush within the insert depression (16) when the reconfigurable bolster (6) is pushed down, whether the arms (10) are extending toward or away from the primary cushion (4).

In some embodiments, the reconfigurable bolster (6) can include a pull tab (18) for removing and/or adjusting the reconfigurable bolster (6) when it is pushed down within the insert depression (16) of the primary cushion (4). In some embodiments, the reconfigurable bolster (6) can include a plurality of pull tabs (18) for removing and/or adjusting the reconfigurable bolster (6) when it is pushed down within the insert depression (16) of the primary cushion (4).

Figure 4A:
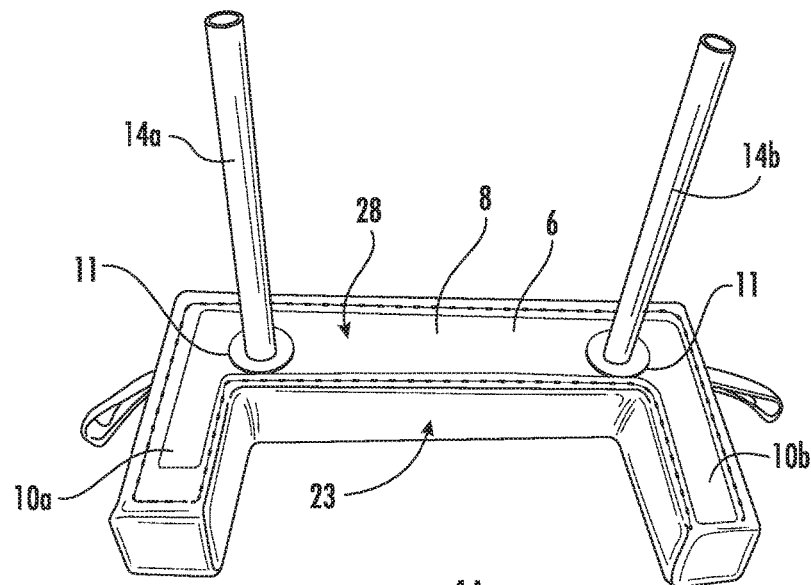
FIG. 4A is a bottom perspective view of a reconfigurable bolster, in accordance with some embodiments described herein.
Figure 4B:
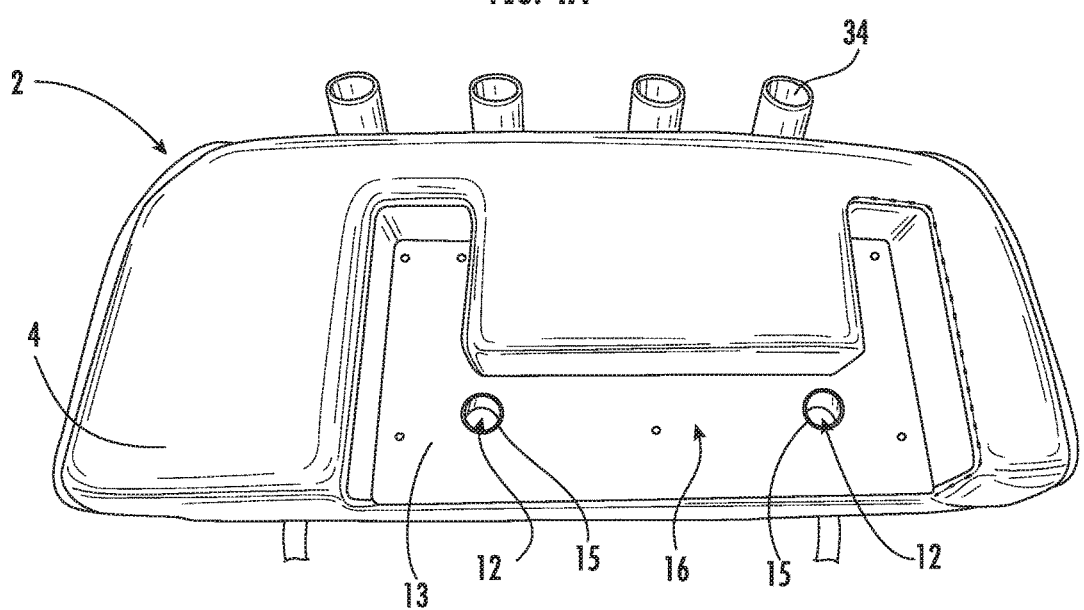
FIG. 4B is a top view of a primary cushion, in accordance with some embodiments described herein.

The reconfigurable bolster (6) includes a top side (24) and a bottom side (28). In some embodiments, the reconfigurable bolster (6) includes at least one positioning rod (14) extending from the bottom side (28) of the reconfigurable bolster (6). In such embodiments, the primary cushion (4) can include at least one bolster opening (12), each adapted for receiving the positioning rod (14). In some embodiments, the primary cushion (4) can include a rigid material (e.g., metal, wood, plastic) that provides strength to the area under and/or around the bolster opening (12). As shown in FIG. 4B, for example, in some embodiments a rigid panel (13) can be located (in whole or in part) in the insert depression (16), and the rigid panel (13) can include openings corresponding to the bolster openings (12). As shown in FIG. 4B, for example, in some embodiments a rigid pipe (15) can be inserted into the primary cushion (4). In such embodiments, the rigid pipe (15) can be positioned and adapted with an appropriate diameter to receive the positioning rod (14).

Figure 5B:
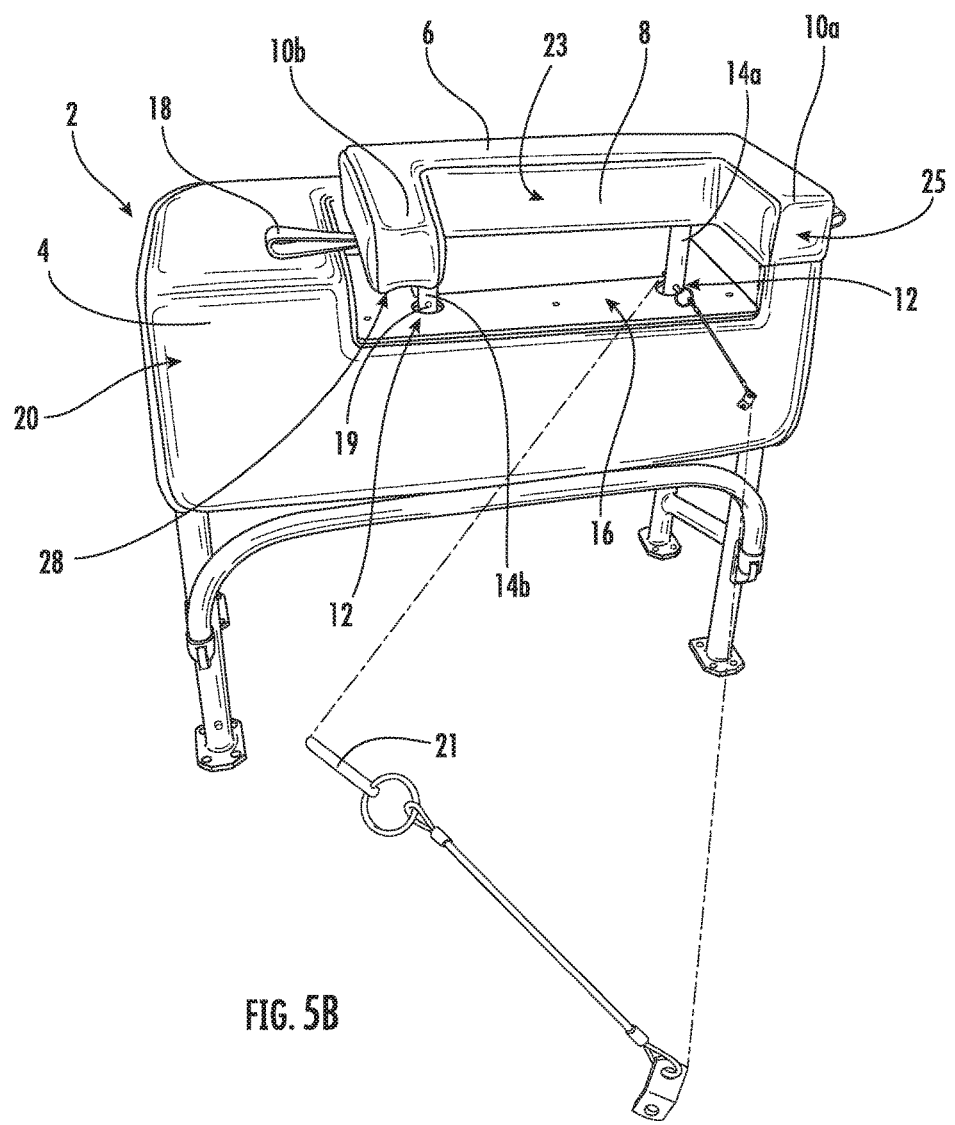
FIG. 5B is a front perspective view of the bench seat, in accordance with some embodiments described herein.
Figure 5C:
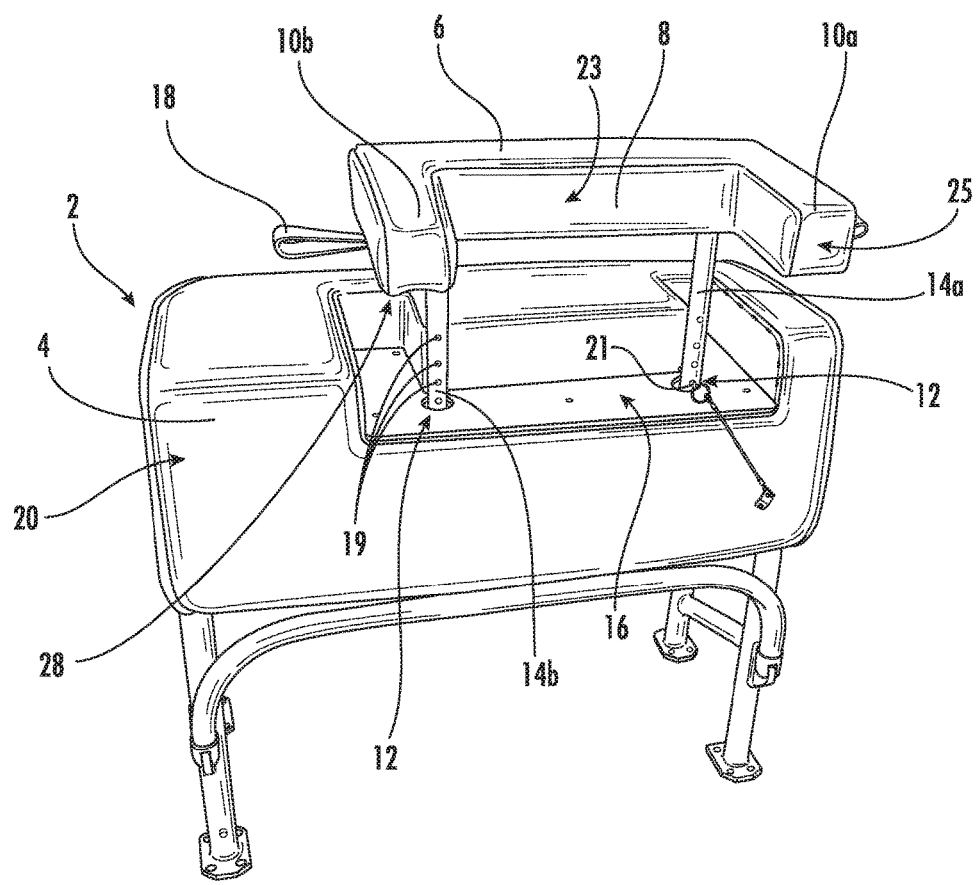
FIG. 5C is a front perspective view of the bench seat, in accordance with some embodiments described herein.

In some embodiments, the reconfigurable bolster (6) can include a plurality of positioning rods (14) spaced apart laterally and extending from the bottom side (28) of the reconfigurable bolster (6). In some embodiments, as shown in FIGS. 3, 5B, and 5C, the reconfigurable bolster (6) includes two positioning rods (14a, 14b) spaced apart laterally. In such embodiments, the bench seat (2) includes two bolster openings (12a, 12b), each adapted for receiving one of the positioning rods, as shown in FIGS. 4B, 5B, and 5C. In such embodiments, two positioning rods (14a, 14b) will prevent the reconfigurable bolster (6) from twisting or turning when a user leans against it. In some embodiments, for example, the reconfigurable bolster (6) can include three positioning rods (14) spaced apart laterally, and the bench seat (2) can include three bolster openings (12), each adapted for receiving one of the positioning rods. In some embodiments, the reconfigurable bolster (6) can include a rigid material (e.g., metal, wood, plastic) that provides strength to the area around the positioning rod (14), and prevents the positioning rod (14) from turning or twisting. In some embodiments, as shown in FIG. 4A, for example, a metal collar (11) can be secured around the positioning rod (14) and fastened to the bottom side (28) of the reconfigurable bolster (6). In some embodiments, for example, a rigid material can be included within the reconfigurable bolster (6) to which the positioning rod (14) and/or metal collar (11) can be secured to. In some embodiments, the bottom side (28), such as the surface, can include the rigid material.

In some embodiments, the height of the reconfigurable bolster (6) can be adjusted relative to the primary cushion (4). For example, as shown in FIGS. 5A-5C, the positioning rod (14) is configured to adjust the reconfigurable bolster (6) between various heights. The cross-section of the positioning rod (14) can be any suitable shape, including, for example, a circle or rectangle. In such embodiments, the positioning rod (14) can be hollow or solid.

As shown in FIG. 5B, for example, the positioning rod (14) can include at least one adjustment opening (19). In some embodiments, the at least one adjustment opening (19) can be configured for receiving a removable pin (21). In some embodiments, the positioning rod (14) includes a plurality of adjustment openings (19), each configured to receive a removable pin (21). As shown in FIGS. 5B and 5C, the removable pin (21) can be adapted to pass through the adjustment opening (19) on the positioning rod (14). In such embodiments, the removable pin (21) can include a portion that extends into or through the positioning rod (14) and the remaining portion can be supported by a rigid panel (13) that forms a lower surface or is located below the insert depression (16) and surrounds the adjustment opening (12). Optionally, the removable pin (21) can be fastened to the bench seat (2) in any suitable manner (e.g., the removable pin can be coupled to a cable and bracket that is fastened to the bench seat). In some embodiments, the bench seat (2) includes a rigid surface within the insert depression (16) for supporting the weight of the bolster (6) on the removable pin (21). For example, as shown in FIG. 4B, the bench seat (2) can include a panel (13) or a pipe (15) comprising a rigid material (e.g., metal, plastic, wood, etc.).

Other height adjustment mechanisms are contemplated. For example, the height of the reconfigurable bolster (6) is adjustable via a mechanism selected from the group consisting of a rack and pinion mechanism, a cable and pulley mechanism, a ratchet mechanism, a ball screw mechanism, a removable pin and holes arrangement, a spring-loaded push button mechanism, and a hydraulic mechanism.

Figure 8F:
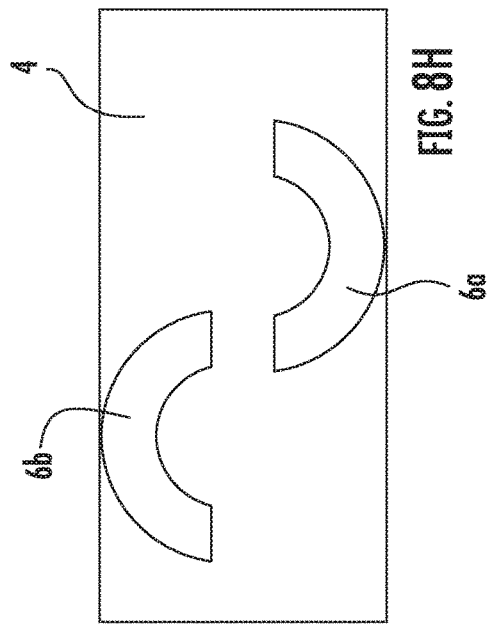
FIG. 8F is a top view of the bench seat, in accordance with some embodiments described herein.
Figure 8G:
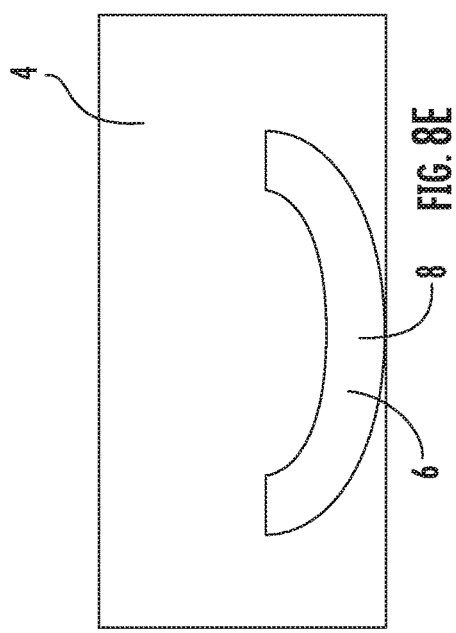
FIG. 8G is a top view of the bench seat, in accordance with some embodiments described herein.
Figure 8H:
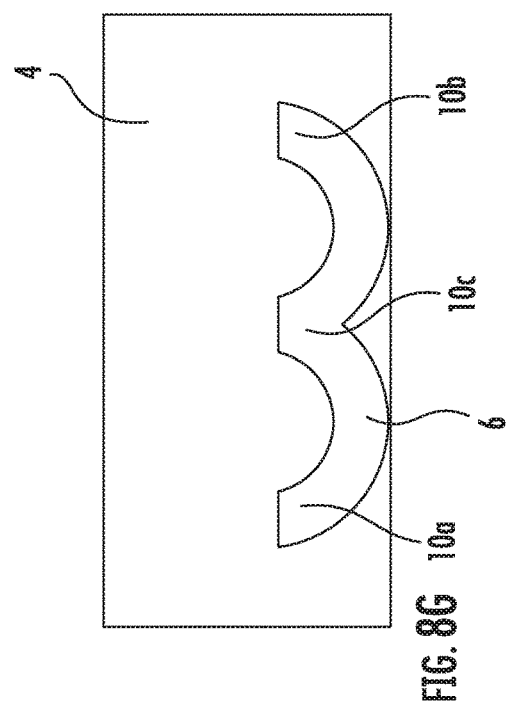
FIG. 8H is a top view of the bench seat, in accordance with some embodiments described herein.

In some embodiments, as shown in FIGS. 8B and 8D, the bench seat (2) includes a primary cushion (4) having two insert depressions (16a, 16b) adapted to receive two reconfigurable bolsters (6a, 6b). In such embodiments, the second reconfigurable bolster (6b) can be the same or different than the first reconfigurable bolster (6a). The insert depressions (16) can be independently oriented in the same or different direction with respect to the primary cushion (4). In such embodiments, the first reconfigurable bolster (6a) and the second reconfigurable bolster (6b) can be independently oriented in the same or different directions with respect to the primary cushion (4). For example, as shown in FIGS. 8B, 8D, 8F, and 8H, the first insert depression (16a) and the reconfigurable bolster (6a) can be configured so the arms (10) extend toward the rear surface (22) of the primary cushion (4), and the second insert depression (16b) and the second reconfigurable bolster (6b) can be configured so the arms (10) extend toward the rear surface (22) or the front surface (20) of the primary cushion (4). For example, as shown in FIGS. 8B and 8F, the first and second insert depressions (16a, 16b) and the first and second reconfigurable bolsters (6a, 6b) are positioned along the front surface (20) of the primary cushion (4) such that the arms (10) extend toward the rear surface (22) of the primary cushion (4) when the reconfigurable bolster (6) is pushed down into the insert depression (16). Alternatively, as shown in FIGS. 8D and 8H, one of the insert depressions (16a, 16b) and one of the reconfigurable bolsters (6a, 6b) is oriented such the arms (10) extend toward the front surface (20) of the primary cushion (4), while the other insert and reconfigurable bolster is oriented such that the arms (10) extend toward the rear surface (22) of the primary cushion (4) when the reconfigurable bolster (6) is pushed down into the insert depression (16). In such embodiments, one of the arms (10) in each of the reconfigurable bolsters (6a, 6b) can extend towards the intermediate portion (8) of the opposing reconfigurable bolster (6).

In some embodiments, the bench seat (2) can be configured to be supported by a frame (30), the frame being any suitable material, including, for example, a metal or metal alloy. In some embodiments, as shown in FIG. 7, the frame (30) is configured to elevate the bench seat (2) to an appropriate height for a user to lean against or sit on. In some embodiments, as shown in FIG. 6A, the frame (30) includes a removably and/or pivotably coupled foot bar (32). In some embodiments, the foot bar (32) includes an elongated body extending laterally at a spaced distance from the frame (30), and connecting arms extending from opposing ends of the elongated body toward opposing lateral ends of the frame (30) along a transverse axis. In some embodiments, as shown in FIGS. 2, 3, 4B, 6A, and 6B, the frame (30) can include a fishing rod holder (34) or a plurality of fishing rod holders (34). In some embodiments, as shown in FIG. 6B, the one or more fishing rod holders (34) are independently connected to a rear portion of the frame (30). In some embodiments, the one or more fishing rod holders (34) have an elongated hollow cylindrical configuration for receiving a fishing rod handle. In some embodiments, the one or more fishing rod holders (34) are connected to the frame (30) at an angle such that a fishing rod resting therein is angled toward the stern of a boat and so that a fishing line projecting from the fishing rod enters water behind the boat.

According to the various embodiments described herein, a user can reconfigure the bench seat (2) shown in FIG. 1, which shows the reconfigurable bolster (6) pushed down into the insert depression (16) in a stored position, by lifting the reconfigurable bolster (6) out of the primary cushion (4), as shown in FIG. 3, until the positioning rods (14) are completely removed from the bolster openings (12), as shown in FIGS. 4A and 4B. After the reconfigurable bolster (6) has been removed from the primary cushion (4), it can be rotated 180 degrees, such that the arms (10) extend over the front surface (20), and then the positioning rods (14) can be reinserted into bolster openings (12) so that the reconfigurable bolster (6) is in a use position, as shown in FIG. 5C. While in the use position, the height of the reconfigurable bolster (6) can be adjusted by lowering the positioning rods (14) into the bolster openings (12), as shown in FIGS. 5A and 5B. After the reconfigurable bolster (6) has been adjusted to the desired height, a removable pin (21) can be inserted into an adjustment opening (19), as shown in FIGS. 5B and 5C.

According to the various embodiments described herein, the bench seat (2) can include a frame (30) that couples the bench seat (2) to the deck of a boat. The bench seat (2) can be connected to the boat in various locations, including in proximity to a center console. In boats having a center steering console, for example, the bench seat (2) can be positioned behind the console so that the boat captain can lean against or sit on the bench seat (2). A boat captain often stands while driving the boat in order to see over the bow, which is pitched upward as the boat cruises. As one of ordinary skill in the art would understand, a boat ride can be turbulent as the boat turns, cruises at a fast rate, or crosses a wake. Under such circumstances, the boat captain, while standing, has to balance the forces resulting from the turbulence and steer simultaneously. According to the various embodiments described herein, a boat captain can lean against the bench seat (2), which can prevent the captain from falling toward the stern of the boat. Additionally, the reconfigurable bolster (6), while in the use position, can prevent the captain from falling toward the starboard or port sides of the boat. For example, a captain leaning back against the bench seat (2) will be stabilized longitudinally by the intermediate portion (8) and laterally by the arms (10) of the reconfigurable bolster (6). Accordingly, the bench seat (2) provides a safer ride for the captain.

When the bench seat (2) is positioned behind the console of a center console boat and the reconfigurable bolster (6) is in the stored position, as shown in FIGS. 1 and 2, the back surface (17) of the intermediate portion (8) can be vertically aligned (e.g., within ±0.5 inches or ±1 inch, or ±2 inches) with the front surface (20) of the primary cushion (4). When the reconfigurable bolster (6) is in the use position, as shown in FIGS. 5A-5C and 7, for example, the front surface (23) of the intermediate portion (8) can be vertically aligned (e.g., within ±0.5 inches or ±1 inch, or ±2 inches) with the front surface (20) of the primary cushion (4). In such embodiments, the intermediate portion (8) can be in the about same position whether the reconfigurable bolster (6) is in the stored position or the use position. Accordingly, a standing boat captain who leans against the bench seat (2) while driving the boat can maintain a preferred position with respect to the steering wheel whether the reconfigurable bolster (6) is in the stored position or the use position. In a preferred position, the boat captain can comfortably reach the steering wheel while leaning back against the bench seat (2). If the distance between the bench seat (2) and the steering wheel were too large, the captain may not be able to reach the wheel, or if the wheel can be reached, the position may not be comfortable because the captain's arms are fully extended at that distance.

The foregoing is provided for purposes of illustrating, explaining, and describing embodiments of this invention. Modifications and adaptations to these embodiments will be apparent to those skilled in the art and may be made without departing from the scope or spirit of this invention.

Although the subject matter has been described in terms of exemplary embodiments, it is not limited thereto. Rather, the appended claims should be construed broadly, to include other variants and embodiments, which may be made by those skilled in the art.

The invention claimed is:

1. A bench seat, comprising:
   a primary cushion; and
   a reconfigurable bolster comprising an intermediate portion and two arms projecting longitudinally forward from a front side of the intermediate portion when the reconfigurable bolster is in a use position,
   wherein the arms are spaced-apart laterally,
   wherein the primary cushion comprises an insert depression configured for receiving the reconfigurable bolster,
   wherein, in a stored position with the arms of the reconfigurable bolster projecting rearward toward the primary cushion and the reconfigurable bolster pushed into the insert depression, a top surface of the primary cushion and a top surface of the reconfigurable bolster are essentially level with each other, and
   wherein the reconfigurable bolster can be removeably coupled to the primary cushion either in the stored position or the use position with the arms projecting away from the primary cushion.

2. The bench seat according to claim 1, wherein the reconfigurable bolster includes a first positioning rod extending downward from a lower side of the reconfigurable bolster, and the bench seat comprises a first bolster opening in the insert depression that is configured for receiving the first positioning rod.

3. The bench seat according to claim 1, wherein the reconfigurable bolster in combination with the primary cushion forms a rectangular seat when the arms project toward the primary cushion and the reconfigurable bolster is pushed down.

4. The bench seat according to claim 1, wherein the reconfigurable bolster in combination with the primary cushion forms a continuous front edge when the arms project toward the primary cushion and the reconfigurable bolster is pushed down.

5. The bench seat according to claim 2, wherein the first positioning rod comprises an adjustment opening with a retractable pin for adjusting the height of the reconfigurable bolster.

6. The bench seat according to claim 2, wherein the first positioning rod comprises an adjustment opening for receiving a removable pin.

7. The bench seat according to claim 6, wherein the first positioning rod further comprises additional adjustment openings for receiving the removable pin.

8. The bench seat according to claim 2, wherein the first positioning rod is located so that the reconfigurable bolster can fit flush in the insert depression whether the arms are facing toward or away from the primary cushion.

9. The bench seat according to claim 2, wherein the reconfigurable bolster includes a second positioning rod and the first and second positioning rods are spaced-apart laterally, and the bench seat comprises a second bolster opening and the two bolster openings are configured for receiving the first and second positioning rods.

10. The bench seat according to claim 1, further comprising an additional reconfigurable bolster comprising an additional intermediate portion and two additional arms projecting forward from the additional intermediate portion, wherein the two additional arms are spaced-apart laterally.

11. The bench seat according to claim 10, wherein the reconfigurable bolster and the additional reconfigurable bolster are each positioned along a front surface of the bench seat.

12. The bench seat according to claim 10, wherein the reconfigurable bolster is positioned along a front surface of the bench seat and the additional reconfigurable bolster is positioned along a back surface of the bench seat.

13. The bench seat according to claim 1, wherein the reconfigurable bolster further comprises a third arm projecting forward from the two intermediate portion, and wherein the third arm is spaced-apart laterally from the arms.

14. The bench seat according to claim 1, wherein the reconfigurable bolster is in a stored position when the arms project toward the primary cushion and is pushed down into the insert depression and in a use position when the arms project away from the primary cushion; and wherein the intermediate portion is in approximately the same longitudinal position with respect to the front surface of the primary cushion when the reconfigurable bolster is in the stored and use positions.

15. A bench seat, comprising:
a primary cushion; and
a reconfigurable bolster comprising an intermediate portion and two arms extending longitudinally forward or aft from the intermediate portion,
wherein the arms are spaced-apart laterally,
wherein the primary cushion comprises an insert depression configured for receiving the reconfigurable bolster when the arms extend toward the primary cushion,
wherein the reconfigurable bolster can be removeably coupled to the bench seat either with the arms extending longitudinally aft toward the primary cushion or with the arms extending longitudinally forward away from the primary cushion,
wherein the reconfigurable bolster includes at least one positioning rod extending longitudinally downward from a lower side of the reconfigurable bolster, and the bench seat comprises at least one bolster opening in the insert depression, the bolster opening configured for receiving the positioning rod,
wherein the reconfigurable bolster is in a stored position when the arms extend longitudinally toward the primary cushion and are pushed down into the insert depression and in a use position when the arms extend longitudinally away from the primary cushion, and
wherein the intermediate portion is in substantially the same forward and aft position when the reconfigurable bolster is in the stored and use positions.

16. The bench seat according to claim 15, wherein the reconfigurable bolster in combination with the primary cushion forms a continuous front edge when the arms extend toward the primary cushion and the reconfigurable bolster is pushed down.

17. The bench seat according to claim 15, wherein the at least one positioning rod comprises at least one adjustment opening for receiving a removable pin.

18. The bench seat according to claim 15, wherein the at least one positioning rod is located so that the reconfigurable bolster can fit flush with a top surface of the primary cushion in the insert depression whether the arms are facing toward or away from the primary cushion.

19. The bench seat according to claim 15, wherein the reconfigurable bolster includes two positioning rods, including the at least one positioning rod, that are spaced-apart laterally, and the bench seat comprises two bolster openings for receiving the positioning rods.

* * * * *